Aug. 13, 1929.　　　I. D. TOMLINSON　　　1,724,889
WEIGHING MACHINE
Filed Dec. 13, 1926　　2 Sheets-Sheet 1
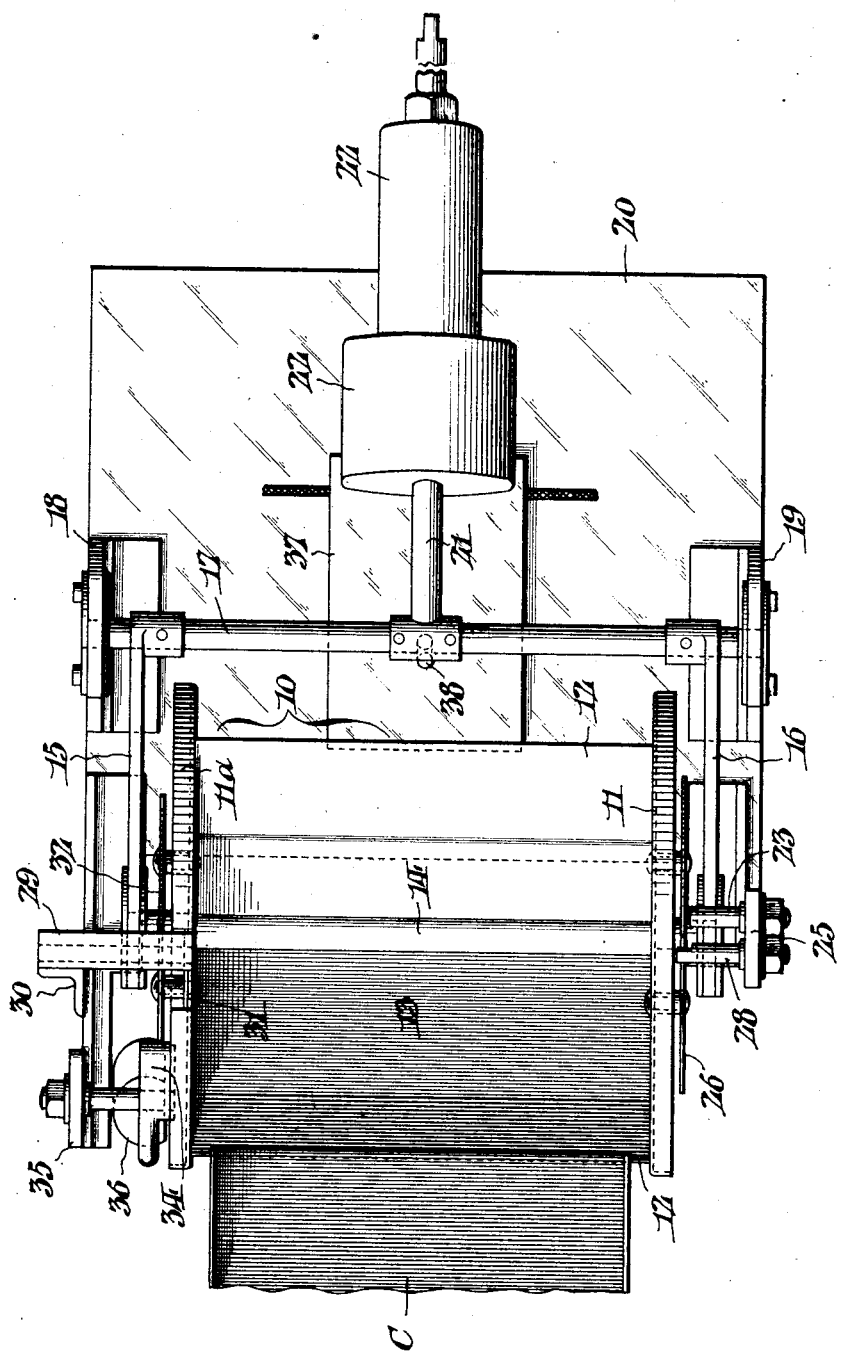
WITNESSES
INVENTOR:
Ira D. Tomlinson,
BY
ATTORNEYS.

Aug. 13, 1929.　　　I. D. TOMLINSON　　　1,724,889
WEIGHING MACHINE
Filed Dec. 13, 1926　　　2 Sheets-Sheet 2
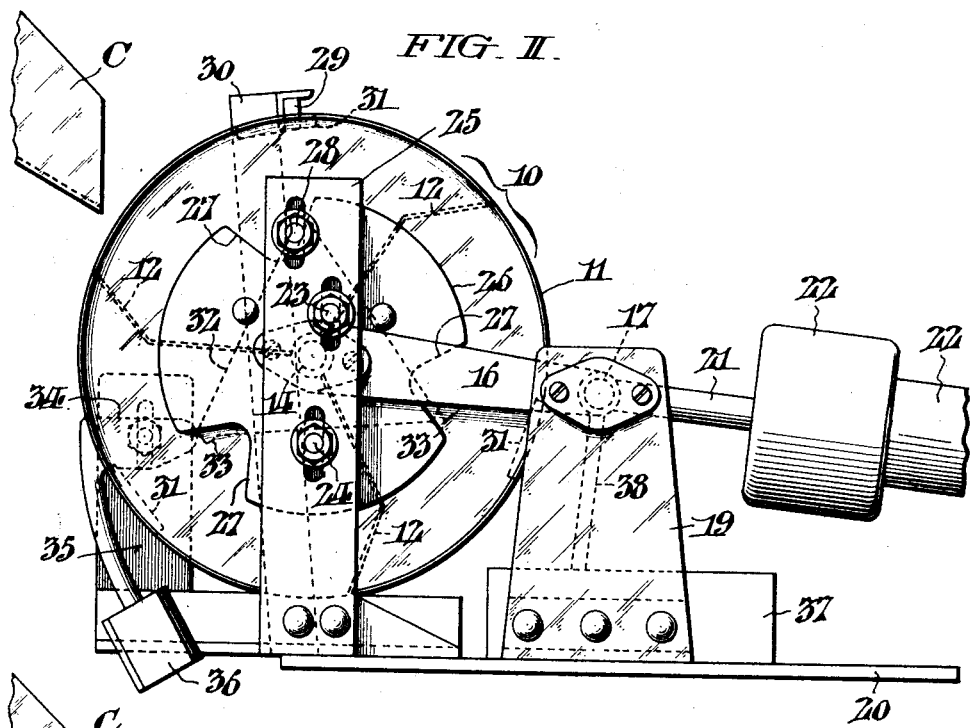
FIG. II.
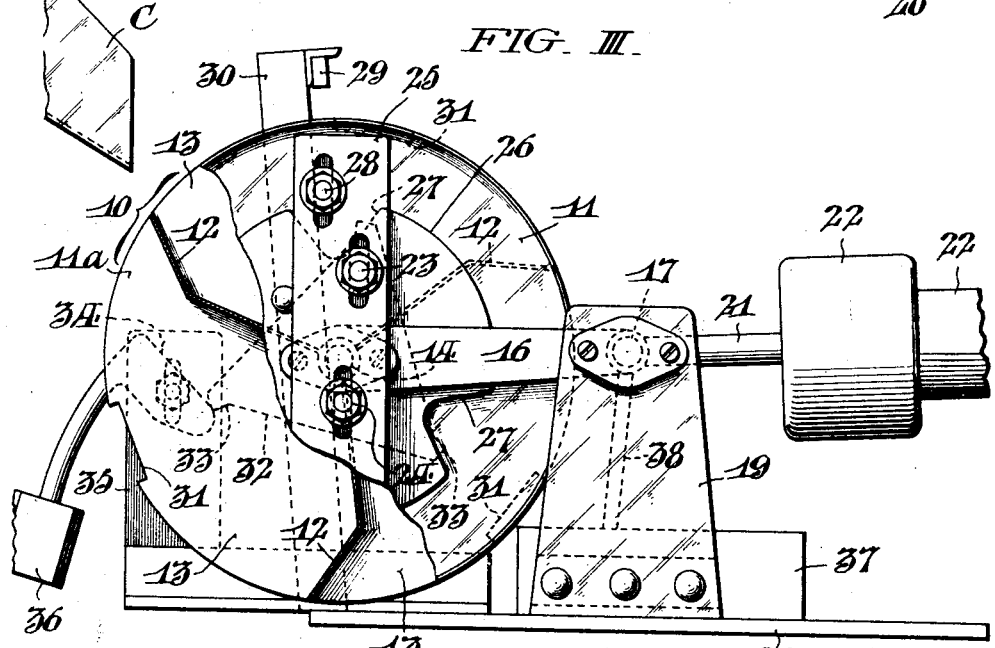
FIG. III.
WITNESSES
INVENTOR:
Ira D. Tomlinson,
BY
ATTORNEYS.

Patented Aug. 13, 1929.

1,724,889

UNITED STATES PATENT OFFICE.

IRA D. TOMLINSON, OF ERDENHEIM, PENNSYLVANIA, ASSIGNOR TO THE AMERICAN PULLEY COMPANY, OF PHILADELPHIA, PENNSYLVANIA, A CORPORATION OF PENNSYLVANIA.

WEIGHING MACHINE.

Application filed December 13, 1926. Serial No. 154,401.

This invention relates to machines for weighing fluent substances or materials which may be liquids, semi-liquids, or finely divided solids such as sand, gravel, coal, etc.

The main objects of my invention are to enable weighing of substances or materials of the kind mentioned without necessitating interruption of their continuous flow or progression incidental to transport or handling in manufactories, storage plants, etc., and to provide a compact, accurate and reliable machine capable of accomplishing this purpose.

Other objects and attendant advantages will be manifested in the detail description which follows of the typical embodiment of my invention shown in the drawings whereof Fig. I shows a plan view of the weighing machine.

Fig. II is a side elevation of the organization; and

Fig. III is a view similar to Fig. II with the parts differently positioned.

With more detailed reference to these illustrations, 10 designates an independently-movable element in the form of a rotating receptacle comprising circular peripherally-flanged heads 11—11ª, which for the sake of lightness, are preferably die stamped from sheet metal and support between them a number of radically-arranged obtuse angular vanes 12 with consequent provision of a circumferential series of pockets 13. The receptacle 10 is mounted on an axis 14 with journal bearings in the ends of companion extremities 15—16 that reach forward from a shaft 17. This shaft is sustained for rocking movement by brackets or standards 18—19 upstanding from the base plate 20 of the machine, and has secured to it, centrally between the extremities 15—16, a rearwardly extending arm 21 carrying weights 22 which are positionally-adustable, as well as removable for the purposes of interchangeability. In effect, the parts 15, 16, 21 together constitute a yielding support or balance arm, which, for convenience in further description as well as in certain of the claims, will be referred to simply as such. The rocking movement of this balance arm is limited by upper and lower stop pins 23—24 adapted to respectively engage with the top and bottom edges of the extremity 16, said stops being supported, with capacity for vertical adjustment relatively, by a vertical bracket 25 rising from the base plate 20 forward of the standard 19 at the corresponding side of the machine.

The material to be weighed is continuously conducted from a source of supply (not shown) through a gravity chute C which discharges laterally into the circumferential pockets 13 of the receptacle 10 as they are successively presented in a manner later on explained. To normally prevent rotation of the receptacle 10 while its pockets 13 are being filled, I provide a disk 26 which is fixed to the head 11, and in the present instance has a series of equi-spaced acute-angular peripheral notches 27 corresponding in number to that of the pockets. From Fig. II it will be seen that when the receptacle 10 is in the normal raised position for filling, the then uppermost notch 27 of the disk 26 engages a detent in the form of a pin 28 adjustable on the bracket 25 previously referred to and, thus, prevents rotation of the receptacle 10 in either direction. By virtue of the ample proportioning of the notches 27 of the disk 26, the receptacle 10 is nevertheless liable to oscillate or rock back and forth incidentally to loading. To offset this possibility, the machine is equipped with a supplemental check stop 29 that reaches inward from an upright angle support 30 to overhang the bucket head 11ª and successively engage peripheral notches 31 therein, the number of notches here again corresponding to the subdivisions 13 of the element 10.

Immediately upon accumulation in the active pocket 13 of the receptacle 10 of a quantity of the material sufficient to overcome the weights 22, the balance arm 15—16—21 swings on its axis 17 as far as permitted by the stop 24. The resultant downward retreat of the element 10 is attended by withdrawal of its head 11ª from the supplemental check stop 29 and retraction of the disk 26 with respect to the detent 28. The element 10 is thereby released, and, under the influence of gravity upon the material in its filled pocket 13, is caused to rotate automatically in counter clockwise direction to the position of Fig. III with incident dumping of the charge from such pocket and concurrent positioning of the succeeding pocket for filling.

In order to insure proper registry of the newly presented pocket 13 with respect to the supply chute C, the rotative movement of the element 10 is restricted against overthrow by a second disk 32 which is fixed to the end of the axis 14 opposite to that occupied by the disk aforementioned, and has projections 33 (likewise corresponding in number to the pockets 13) adapted to successively cooperate with a stop 34. This stop is pivotally mounted to a bracket 35 at the corresponding side of the machine and counterweighted as at 36 for capacity to yield in accommodating itself to the action of the element 10.

Upon being relieved of its charge in the manner explained, the element 10 is automatically returned to the normal raised position of Fig. II through the overbalancing effect of the weights 22 on the balance arm 15, 16, 21. As the element 10 rises, the detent 28 coming in contact with the succeeding notch 27 in the disk 26 gradually becomes seated in the base of the notch, thus positioning the succeeding pocket for filling. At the same time as this return movement takes place, the stop 34 acts to restrain rotation thereby to insure engagement of this notch with the detent 28 and of the succeeding notch 31 in the head 11ª with the supplemental stop 29. When the foregoing has all been accomplished, it will be seen that the pocket 13 of the element 10 immediately following the one just emptied will be presented in proper relation to the chute C to receive its charge in turn. Such operations of the machine will obviously be substantially instantaneous with consequent rapid substitution of an empty pocket 13 for one previously filled to the avoidance of any spilling of the material whatsoever.

For the purpose of recording the successive operations of the element 10, any suitable counting means may be employed, for example, one such as conventionally represented at 37 capable of being actuated by a downward extremity 38 from the shaft 17 of the balance arm 15, 16, 21.

With the described construction and characteristic mode of operation of the machine of my invention, it will thus be seen that fluent substances, either liquids or granular solids, can be accurately weighed without interruption in their continuous flow or progression during processing or conveyance from one place or level to another.

Having thus described my invention, I claim:

1. A weighing machine comprising a rotatable element affording a circumferential series of pockets adapted to be successively filled with material to be weighed, a disk rotatable with the receptacle and having relatively deep angular notches, a detent to cooperate with the notches in the disk in normally holding the element from rotating during filling, and a support for the element adapted to yield under load of added weight of a predetermined quantity of the material with incidental recession of the disk from the detent and release of the element for automatic rotation to dump the contents from a filled pocket and to concurrently effect gradual positioning of a succeeding pocket for filling.

2. A weighing machine comprising a rotatable element affording a circumferential series of pockets adapted to be successively filled with material to be weighed, a notched disk rotatable with the receptacle, a detent to cooperate with the notches in the disk in normally holding the element from rotating in either direction during filling, a support for the element adapted to yield under load of added weight of a predetermined quantity of the material with incidental recession of the disk from the detent and release of the element for automatic rotation to dump the contents from a filled pocket, and means to check such rotation of the element when the succeeding notch of the disk becomes aligned with the detent thereby to insure proper positioning of the next pocket for filling.

3. A weighing machine comprising a rotatable element affording a circumferential series of pockets adapted to be successively filled with material to be weighed, a disk rotatable with the receptacle, a detent to cooperate with notches in the disk in normally holding the element from rotating during filling, a support for the element adapted to yield under load of added weight of a predetermined quantity of the material with incidental recession of the disk from the detent and release of the element for automatic rotation to dump the contents from a filled pocket, a stop adjacent the element, and means also rotatable with the element aforesaid having projections to engage said stop for limiting the rotative movement in predetermining subsequent registry of the succeeding notch of the disk with the detent and thereby insure proper positioning of the next pocket for filling.

4. A weighing machine comprising a rotatable element affording a circumferential series of pockets adapted to be successively filled with material to be weighed, means to normally hold the element from rotating in either direction, supplemental means operative at the same time to prevent oscillation of the element during filling, a support for the element adapted to yield under load of added weight of a predetermined quantity of the material with incidental recession of said element from the holding and supplemental means, for automatic rotation to dump the contents of a filled pocket and to concurrently position a succeeding pocket for filling.

5. A weighing machine comprising a rotatable element affording a circumferential series of pockets adapted to be successively filled with material to be weighed, a notched disk rotatable with the element, a detent to cooperate with the notches in the disk in normally holding the element from rotating during filling, a check stop operative at the same time to prevent oscillation of the element, and a support for the element adapted to yield under load of added weight of a predetermined quantity of the material with incidental recession of the disk from the detent and disengagement of the check stop from the element whereby the element is released for automatic rotation to dump the contents of a filled pocket and to concurrently position a succeeding pocket for filling.

6. A weighing machine comprising a rotatable element affording a circumferential series of pockets adapted to be successively filled with material to be weighed, a disk rotatable with the element, a detent to cooperate with notches in the disk in normally holding the element from rotating during filling, a support for the element adapted to yield under load of added weight of a predetermined quantity of the material with incidental release of the element for automatic rotation to dump the contents from a filled pocket, a second disk also rotatable with the element and having projections thereon, and a counterweighted stop cooperating with said projections to restrict rotative movement and thereby effect proper positioning of the succeeding pocket for filling.

In testimony whereof, I have hereunto signed my name at Philadelphia, Pennsylvania, this 6th day of December, 1926.

IRA D. TOMLINSON.